(12) United States Patent
Kitamura et al.

(10) Patent No.: US 7,340,362 B2
(45) Date of Patent: Mar. 4, 2008

(54) AZIMUTH MEASUREMENT DEVICE AND AZIMUTH MEASUREMENT METHOD

(75) Inventors: Toru Kitamura, Chigasaki (JP); Masanobu Sato, Atsugi (JP); Masaya Yamashita, Machida (JP); Norihiko Mikoshiba, Machida (JP)

(73) Assignee: Asahi Kasei Emd Corporation, Tokyo (JP)

(*) Notice: Subject to any disclaimer, the term of this patent is extended or adjusted under 35 U.S.C. 154(b) by 0 days.

(21) Appl. No.: 10/563,128

(22) PCT Filed: Jul. 1, 2004

(86) PCT No.: PCT/JP2004/009324

§ 371 (c)(1),
(2), (4) Date: Jun. 12, 2006

(87) PCT Pub. No.: WO2005/003683

PCT Pub. Date: Jan. 13, 2005

(65) Prior Publication Data

US 2007/0033818 A1    Feb. 15, 2007

(30) Foreign Application Priority Data

Jul. 3, 2003   (JP) .............................. 2003-270821

(51) Int. Cl.
*G01C 21/28* (2006.01)
(52) U.S. Cl. ........................................ 702/95; 701/224
(58) Field of Classification Search ................ 702/95; 701/224
See application file for complete search history.

(56) References Cited

U.S. PATENT DOCUMENTS 1,422,942 A    7/1922   Eberly (Continued)

FOREIGN PATENT DOCUMENTS

JP     62-255814    11/1987

(Continued)

OTHER PUBLICATIONS

Copy of International Preliminary Search Report on Patentability in International Application No. PCT/JP2004/018888, dated Aug. 22, 2006, 6 pages.

(Continued)

*Primary Examiner*—John Barlow
*Assistant Examiner*—Sujoy Kundu
(74) *Attorney, Agent, or Firm*—Finnegan, Henderson, Farabow, Garrett & Dunner, LLP

(57) ABSTRACT

There are provided an azimuth measurement device and its method for realizing an update of an offset calculated from the data acquired by azimuth measurement. A geomagnetism output measured by a 3-axis magnetic sensor is amplified and input to an A/D conversion section. A chopper section is arranged for switching the terminals for driving an X-axis, Y-axis and a Z-axis magnetic sensor and applies drive voltage output from a drive power source section to the X-axis, the Y-axis and the Z-axis magnetic sensor. The output amplified value amplified by the amplification section is converted from an analog signal to a digital signal by the ND conversion section and then is input to a sensitivity/offset correction calculation section. Output data from this sensitivity/offset correction calculation section is input to an azimuth calculation section and the corresponding azimuth information is output. A reliability information calculation section outputs reliability information.

55 Claims, 9 Drawing Sheets

U.S. PATENT DOCUMENTS

| | | | |
|---|---|---|---|
| 4,497,034 A | 1/1985 | Kuno et al. | |
| 2005/0256673 A1 | 11/2005 | Hikida et al. | |
| 2006/0031014 A1* | 2/2006 | Sato et al. | 701/224 |

FOREIGN PATENT DOCUMENTS

| | | |
|---|---|---|
| JP | 64-046610 | 2/1989 |
| JP | 1-173614 (U) | 12/1989 |
| JP | 03-048713 | 3/1991 |
| JP | 03-154821 | 7/1991 |
| JP | 08-105745 | 4/1996 |
| JP | 61-147104 | 7/1996 |
| JP | 08-313261 | 11/1996 |
| JP | 10-132568 | 5/1998 |
| JP | 2000-131068 | 5/2000 |
| JP | 2003-035010 | 2/2003 |
| JP | 2003-042766 | 2/2003 |
| JP | 2003-065791 | 3/2003 |
| JP | 2004-309228 | 11/2004 |
| WO | WO 2004/003476 | 1/2004 |

OTHER PUBLICATIONS

Copy of International Search Report in International Application No. PCT/JP2004/01888, dated Mar. 29, 2005, 1 page.

Official Notice of Rejection of Korean Patent Office for corresponding Korean Patent Application No. 10-2006-7000029, dated Jun. 28, 2007.

* cited by examiner

⟶ LOOSEN
⟵ TIGHTEN

| No. | OFFSET DISPERSION RANGE DECISION VALUE (*1) (FIRST RELIABILITY INFORMATION) | GEOMAGNETISM DECISION VALUE (*2) (SECOND RELIABILITY INFORMATION) | OFFSET CALCULATION DATA NO. (THIRD RELIABILITY INFORMATION) | MEASUREMENT TIME INTERVAL |
|---|---|---|---|---|
| 1 | (a) | ① | 30 | 1sec |
| 2 | (b) | ② | 15 | 1sec |
| 3 | (c) | ③ | 10 | 500msec |
| 4 | (d) | ④ | 5 | 100msec |

(*1) REFER TO FIG. 3.
(d): OTHER THAN (a) TO (c)
(*2) REFER TO FIG. 4.

FIG.6

AZIMUTH MEASUREMENT DEVICE AND AZIMUTH MEASUREMENT METHOD

TECHNICAL FIELD

The present invention relates to an azimuth measurement device and an azimuth measurement method and, more particularly, to an azimuth measurement device and an azimuth measurement method for calculating an offset quickly or highly accurately from the magnetic data group acquired for measuring an azimuth, in accordance with the situations.

BACKGROUND ART

For the azimuth measurement device for detecting the geomagnetism to calculate the azimuth, it is important to discriminate a geomagnetism (i.e., a steady magnetic field) and such a magnetic field other than the geomagnetism as is generated by a magnet or the like fixed in the azimuth measurement device. The magnetic field other than the geomagnetism is calculated as an offset (or a reference point) from a measured magnetic data group by proper means. The geomagnetism can be determined by subtracting that offset from the measured magnetic value.

This offset highly changes in dependence upon whether a magnetic element (e.g., a memory card) accompanying the azimuth measurement device is mounted or demounted. Alternatively, the user of the azimuth measurement device may evaluate that the calculated value of the offset is improper, and may require a recalculation intentionally.

As an azimuth measurement device of the prior art, an azimuth measurement device has been proposed in Patent Document 1. This azimuth measurement device measures the azimuth on the basis of the geomagnetism which is detected by using a Hall element. A corrected value storage section is stored with the reference values of an X-axis Hall element and a Y-axis Hall element. By using the reference values, a correction calculation section corrects the amplified output values of the X-axis Hall element and the Y-axis Hall element, and extracts only the values proportional to the individual axis components of the geomagnetism.

On the other hand, Patent Document 2 provides an azimuth measurement device, which is made highly accurate by correcting the error of the mounting angle between the direction of the input axis of the geomagnetism sensor and the direction of the reference axis of a position detection device. This azimuth measurement device comprises: a mounting angle correction operation section for performing a mounting angle error correction for geomagnetism data to operate the geomagnetism data corrected; a coordinate transformation circuit for transforming the coordinates of the geomagnetism data by using position data to output the geomagnetism data; and an azimuth calculation circuit for calculating the azimuth on the basis of the geomagnetism data.

Moreover, Patent Document 3 describes an azimuth measurement device using a geomagnetism sensor. The horizontal component of the geomagnetism is so detected that it is divided into voltage output signals of two components by magnetic detection coils orthogonal to each other. These voltage output signals are input to a microcomputer having signal correction operation means to operate azimuth data to the magnetic north of the geomagnetism. The azimuth measurement device is provided with correction processing means for operating corrected values corresponding to the individual azimuth data from the microcomputer.

On the other hand, azimuth measurement devices described in Patent Document 4, Patent Document 5 and Patent Document 6 are also known in addition to the aforementioned publications.

A device of the prior art of Patent Document 7 corrects the offset of the magnetic sensor in the azimuth measurement device and is enabled to calculate offset information with respect to the individual axis outputs of a magnetic sensor merely by changing the direction of a mobile telephone arbitrarily. Moreover, the calibration work of the offset is facilitated to lighten the burden on the user at the time when the offset is calibrated.

This application calculates the dispersion of reference points estimated, and discards the estimated reference point in case the dispersion is at a predetermined value or higher. If this predetermined value (as will be called the "acceptance threshold") is set high, an offset of a large error may be calculated. Since the offset is easily updated, it is instantly corrected even if highly changed.

In case the decided value is small, on the contrary, the offset is hard to update. Incase, therefore, an offset of a small error has already been calculated, an estimated offset value of a larger error can be kept highly accurate by discarding it. In case, however, the offset highly changes, a long time is taken till the correct offset is adopted. For these reasons, a plurality of specifications such as the response rate or accuracy required for the azimuth measurement device are hard to satisfy at the same time, if the adoption and discard of the reference point are determined by using one acceptance threshold at all times.

The present invention has been conceived in view of those problems, and has an object to provide an azimuth measurement device and an azimuth measurement method for calculating a highly accurate offset quickly according to the situations from a magnetic data group acquired for measuring the azimuth.

Patent Document 1: Japanese Patent Application Laid-open No. 2003-065791

Patent Document 2: Japanese Patent Application Laid-open No. 2003-042766

Patent Document 3: Japanese Patent Application Laid-open No. 10-132568 (1998)

Patent Document 4: Japanese Patent Application Laid-open No. 61-147104 (1986)

Patent Document 5: Japanese Patent Application Laid-open No. 62-255814 (1987)

Patent Document 6: Japanese Patent Application Laid-open No. 8-105745 (1996)

Patent Document 7: Japanese Patent Application Laid-open No. 2003-035010

DISCLOSURE OF THE INVENTION

According to the invention, there is provided an azimuth measurement device comprising: 2- or 3-axis geomagnetism detection means for detecting the geomagnetism; output data acquisition means for acquiring several times or more either the 2-axis output data at the time when the direction of the geomagnetism detection means changes or the 3-axis output data at the time when the direction of the geomagnetism detection means changes while keeping the 2-axis detecting directions on a predetermined plane in the three-dimensional space; reference point estimation means for selecting the 2- or 3-axis output data on the basis of predetermined measurement parameters, to determine a reference point either on the two-dimensional coordinate space composed of the selected 2-axis output data or on the three-dimensional coordinate space composed of the selected 3-axis output data, thereby to estimate the coordinates of the reference point by a statistical method so that the dispersion of the distances from the selected 2- or 3-axis output data group to the reference point may be minimized; offset information calculation means for calculating the offset information for the output data of the geomagnetism detection means on the basis of a plurality of reference points estimated by the reference point estimation means; azimuth calculation means for calculating an azimuth from the output data and the offset information; and reliability information calculation means for calculating the reliability information of the offset information according to calculation parameters for calculating the reliability information of predetermined offset information, on the basis of at least one of the 2- or 3-axis output data group and the plural reference points.

Moreover, it is preferable that the offset information calculation means compares the reliability information with an acceptance threshold value to evaluate whether or not the reliability information is to be adopted as the offset information to be used for the calculation of the azimuth by the azimuth calculation means.

Moreover, it is more preferable that the acceptance threshold value is changed more strictly as the offset information is adopted a predetermined number of times.

On the other hand, the azimuth measurement device of the invention is preferred to further comprise a detection section for detecting that the magnetic environment inside and outside of the azimuth measurement device has changed, and that the acceptance threshold value is loosened in case the detection section detects that the magnetic environment has changed.

The detection section can detect that the magnetic environment has changed, in case the data acquired by the output data acquisition means exceeds a predetermined range.

It is preferred that an azimuth measurement device of the invention further comprises event detection means for detecting either the change in the environment of the azimuth measurement device or the operation of the operator, and that the acceptance threshold value is changed in case the event occurs.

It is preferred that the azimuth measurement device of the invention that the acceptance threshold value is changed and that at least one of the measurement parameters and the calculation parameters are changed.

Here, the reliability information of the offset information contains the information calculated from the dispersion of the plural reference points, the information calculated from the dispersion of the data composing the 2- or 3-axis output data group, and the distance from the 2- or 3-axis output data obtained by the output data acquisition means, to the reference point.

Moreover, the measurement parameters contain a measurement interval and the number of data for the reference point estimation means to estimate the coordinates of the reference point.

On the other hand: the measurement parameters contain the variation in data; the variation is the difference between the output data acquired by the output data acquisition means and the data selected by the reference point estimation means; and the reference point estimation means can select the data, of which the variation is at a predetermined value or higher.

On the other hand, the calculation parameters contain the number of reference points for calculating the dispersion of the reference points.

The azimuth measurement device of the invention can further comprise output means for outputting at least one of the acceptance threshold value, the measurement parameters and the calculation parameters to the outside.

Moreover, the azimuth measurement device of the invention is preferred that the geomagnetism detection means acquires 3-axis output data, that the azimuth measurement device further comprises information acquisition means relating to the posture angle of the azimuth measurement device, and geomagnetic inclination angle information calculation means for calculating geomagnetic inclination angle information from the output data, the offset information and the posture angle, that the azimuth calculation means calculates the azimuth of the device from the output data, the offset information, and the information relating to the posture angle, and that the index of reliability of the azimuth to be calculated is calculated from the value of the geomagnetic inclination angle information.

According to the invention, there is provided an azimuth measurement method comprising: the step of acquiring, by using 2- or 3-axis geomagnetism detection means for detecting the geomagnetism several times or more, either the 2-axis output data at the time when the direction of the geomagnetism detection means changes while keeping the 2-axis detecting directions on a predetermined plane or the 3-axis output data at the time when the direction of the geomagnetism detection means changes in the three-dimensional space; the step of selecting the 2- or 3-axis output data on the basis of predetermined measurement parameters; the step of determining a reference point either on the two-dimensional coordinate composed of the selected 2-axis output data or on the three-dimensional coordinates composed of the selected 3-axis output data, thereby to estimate the coordinates of the reference point by a statistical method so that the dispersion of the distances from the selected 2- or 3-axis output data group to the reference point may be minimized; the step of calculating the offset information for the output data of the geomagnetism detection means on the basis of the plural reference points estimated; the step of calculating an azimuth from the output data and the offset information; and the step of calculating the reliability information of the offset information according to calculation parameters for calculating the reliability information of predetermined offset information, on the basis of at least one of the 2- or 3-axis output data group and the plural reference points.

Moreover, the offset information calculation step compares the reliability information with an acceptance threshold value to evaluate whether or not the reliability information is to be adopted as the offset information to be used for the calculation of the azimuth.

It is more preferable that the acceptance threshold value is changed more strictly as the offset information is adopted a predetermined number of times.

On the other hand, an azimuth measurement method of the invention is preferred to further comprise: the step of detecting that the magnetic environment inside and outside of the azimuth measurement device has changed; and the step of loosening the acceptance threshold value in case it is detected that the magnetic environment has changed.

Moreover, an azimuth measurement method of the invention is preferred to further comprise: the step of detecting either the change in the environment of the azimuth measurement device or the operation of the operator; and the step of changing the acceptance threshold value in case the event occurs.

At this time, it is preferred that the acceptance threshold value is changed, and that at least one of the measurement parameters and the calculation parameters are changed.

Moreover, the azimuth measurement method of the invention is preferred to further comprise the step of outputting at least one of the acceptance threshold value, the measurement parameters and the calculation parameters to the outside.

Moreover, it is preferred for the azimuth measurement method of the invention that the geomagnetism detection means acquires 3-axis output data, that the azimuth measurement method further comprises: the step of acquiring information relating to the posture angle of the azimuth measurement device; and the step of calculating geomagnetic inclination angle information from the output data, the offset information and the information relating to the posture angle, that the azimuth calculation step calculates the azimuth of the device from the output data, the offset information, and the information relating to the posture angle, and that the azimuth measurement method further comprises the step of calculating the index of reliability of the azimuth to be calculated is calculated from the value of the geomagnetic inclination angle information.

According to the azimuth measurement device or the azimuth measurement method of the invention, on the basis of the reliability information calculated by the reliability information calculation means, the acceptance threshold value at the time of calculating the offset information can be gradually tightened. When the quick response of the system is demanded as when it is started up, the calculation accuracy can be enhanced by setting the aforementioned acceptance threshold at a higher (or looser) value at first and by reducing (or tightening) the acceptance threshold gradually. At the same time, the response or measurement accuracy of the system can also be changed according to the situations even if the minimum values of the number or change of the data composing the magnetic data group for calculating the offset.

BRIEF DESCRIPTION OF THE DRAWINGS

FIG. 6 is a diagram showing an offset updating table.

BEST MODE FOR CARRYING OUT THE INVENTION

Hereinafter, embodiments of the invention are described with reference to the accompanying drawings.

Figure 1:
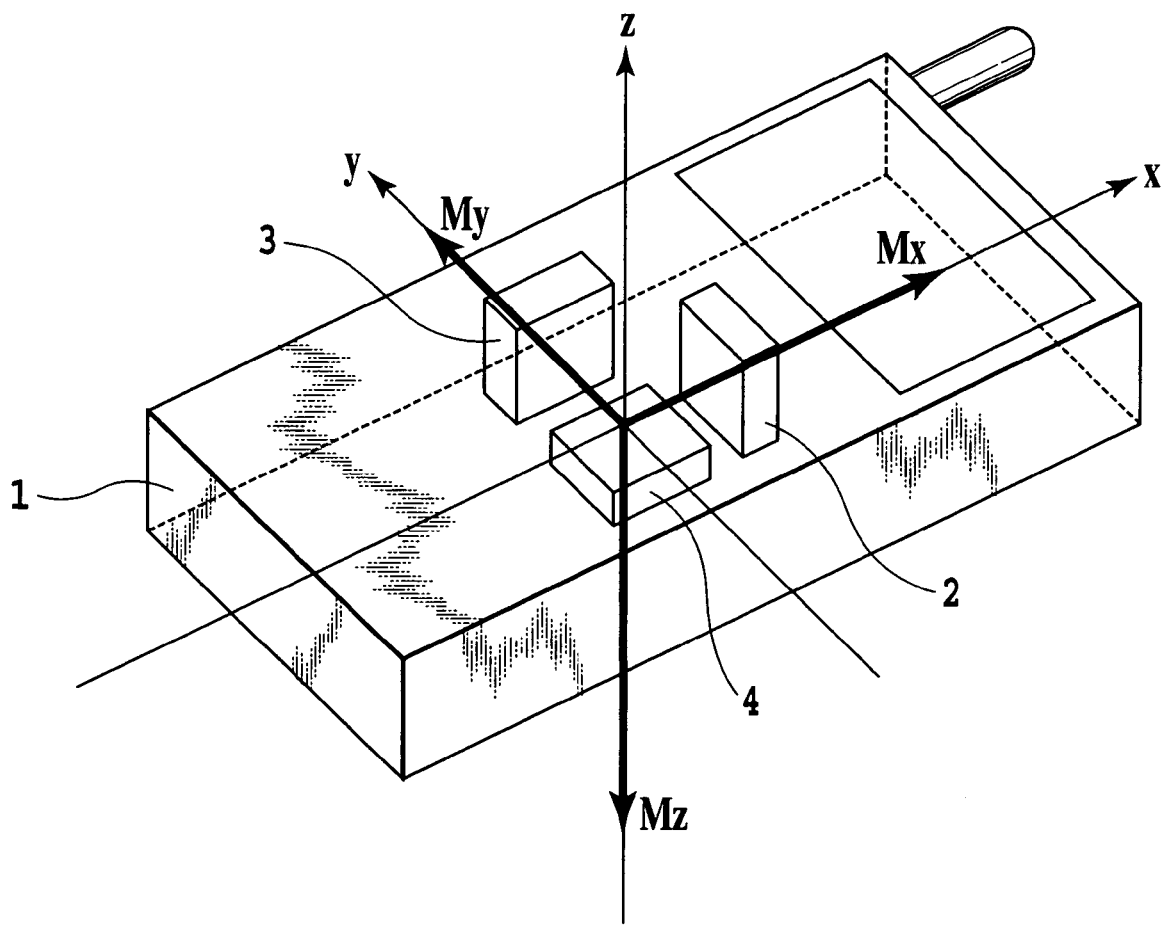
FIG. 1 is a configuration diagram for explaining one embodiment of an azimuth measurement device having a 3-axis magnetic sensor according to the invention.

FIG. 1 is a configuration diagram for explaining one embodiment of an azimuth measurement device having a 3-axis magnetic sensor according to the invention. Numeral 1 designates an azimuth measurement device; numeral 2 an X-axis magnetic sensor; numeral 3 a Y-axis magnetic sensor; and numeral 4 a Z-axis magnetic sensor. In this azimuth measurement device 1, as shown in FIG. 1, the X-axis magnetic sensor 2, the Y-axis magnetic sensor 3 and the Z-axis magnetic sensor 4 having sensitive faces directed in their individual directions are arranged to intersect with each other at a right angle. The X-axis magnetic sensor 2 is configured to produce its output Mx; the Y-axis magnetic sensor 3 is configured to produce its output My; and the Z-axis magnetic sensor 4 is configured to produce its output Mz. Here, the magnetic sensors may be any such as a Hall element so long as they can measure the magnetism.

Figure 2:
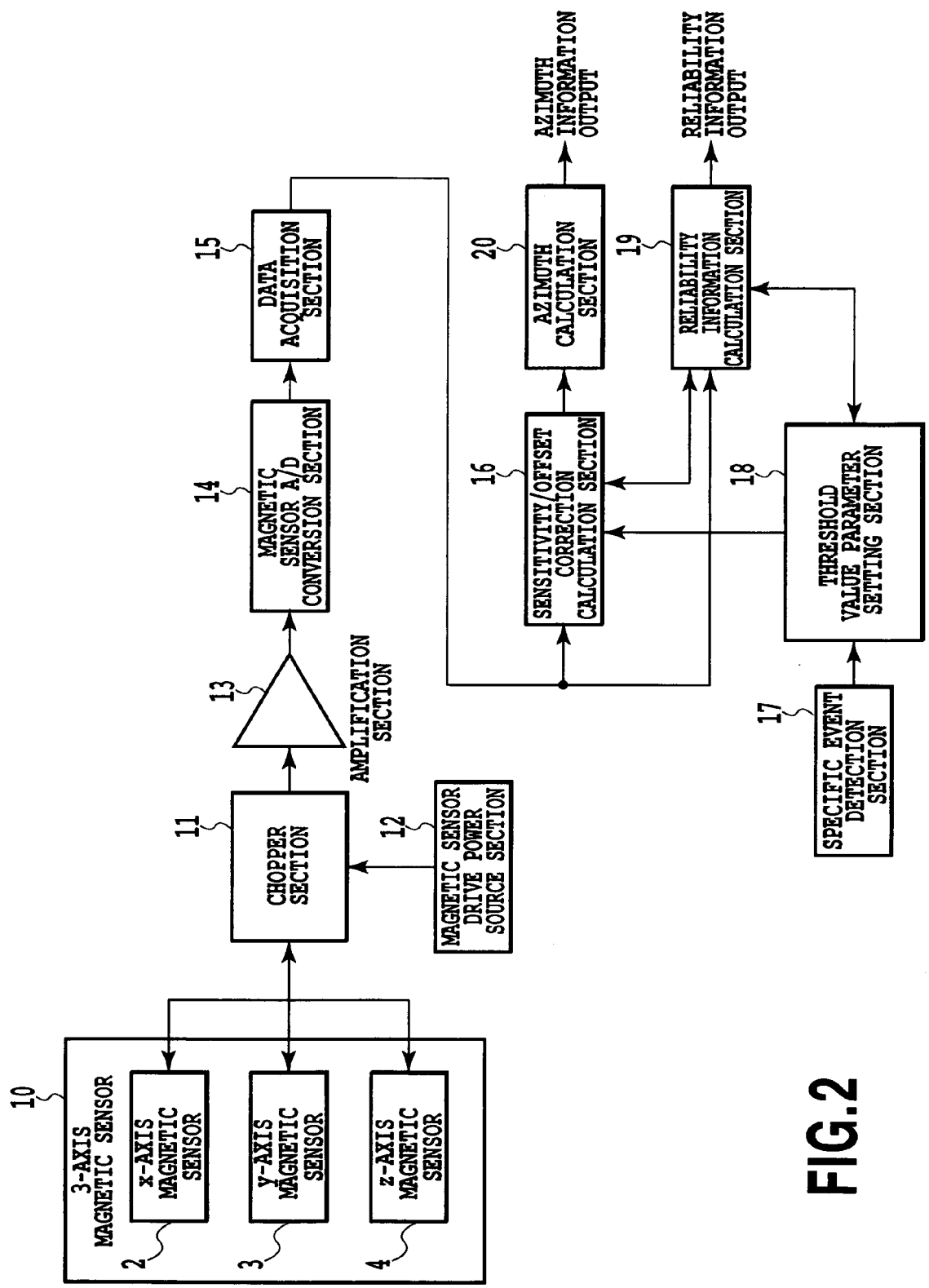
FIG. 2 is a block diagram for explaining one embodiment of the azimuth measurement device having the 3-axis magnetic sensor according to the invention.

FIG. 2 is a block diagram for explaining one embodiment of the azimuth measurement device having the 3-axis magnetic sensor according to the invention. In FIG. 2: numeral 10 designates a 3-axis magnetic sensor (geomagnetism detection means); numeral 11 a chopper section; numeral 12 a drive power source section; numeral 13 an amplification section; numeral 14 an A/D conversion section; numeral 15 a data acquisition section; numeral 16 a sensitivity/offset correction calculation section; numeral 17 a specific event detection section; numeral 18 a threshold value parameter setting section; numeral 19 a reliability information calculation section; and numeral 20 an azimuth calculation section. Here, the configuration components having the same functions as those of FIG. 1 are designated by the same numerals.

The geomagnetism outputs measured by the X-axis magnetic sensor 2, the Y-axis magnetic sensor 3 and the Z-axis magnetic sensor 4 of the 3-axis magnetic sensor 10 are amplified by the amplification section 13 through the chopper section 11 driven by the drive power source section 12 and are input to the A/D conversion section 14. Here, the X-axis magnetic sensor 2, the Y-axis magnetic sensor 3 and the Z-axis magnetic sensor 4 are provided for detecting the geomagnetism and are preferably Hall elements of a compound semiconductor such as InSb, InAs or GaAs.

The chopper section 11 switches terminals for driving the X-axis magnetic sensor 2, the Y-axis magnetic sensor 3 and the Z-axis magnetic sensor 4, and applies the drive voltage output from the drive power source section 12 to the X-axis magnetic sensor 2, the Y-axis magnetic sensor 3 and the Z-axis magnetic sensor 4. This chopper section 11 can use a 90-degree chopper drive or a 360-degree chopper drive, for example. The 360-degree chopper drive can cancel not only the offset terms of the Hall elements themselves, as contained in the outputs of the X-axis magnetic sensor 2, the Y-axis magnetic sensor 3 and the Z-axis magnetic sensor 4, but also the electric offset terms by the amplifier itself of the subsequent step.

The signals output from the X-axis magnetic sensor 2, the Y-axis magnetic sensor 3 and the Z-axis magnetic sensor 4 are amplified by the amplifier 13, and the amplified output values are converted from analog signals into digital signals by the A/D conversion section 14. After converted into the digital signals, the converted data is acquired/stored, and is then output, if necessary, through the data acquisition section 15 and input to the sensitivity/offset correction calculation section 16. On the basis of the measured magnetism data group from the data acquisition section 15, the offsets and the sensitivity correction coefficients of the X-, Y- and Z-axis magnetic sensors 2, 3 and 4 are calculated to compensate the X-, Y- and Z-axis magnetically measured data are corrected on the basis of the offsets and the sensitivity correction coefficients calculated. These output data are input to the azimuth calculation section 20 so that their azimuth information is output. The method for the azimuth operation can be exemplified by the method which is disclosed in our prior application of PCT Laid-Open Application WO2004/003476.

On the basis of the data acquired from the data acquisition section 15, the aforementioned sensitivity/offset correction calculation section 16 selects the acquisition data in accordance with the data measuring conditions. On the basis of the offsets and the selected data group, the sensitivity/offset correction calculation section 16 calculates the sensitivity correction coefficient of the magnetic sensors, the reference point, the radius of the sphere having the magnetic data distributed, the offsets, and the magnitude of the geomagnetism (i.e., the distance of the acquired data to the reference point). On the basis of the sensitivity correction coefficient calculated, moreover, the sensitivity/offset correction calculation section 16 corrects the measured magnetism data.

On the other hand, the signal from the specific event detection section 17 is input to the threshold value parameter setting section 18. This threshold value parameter setting section 18 sets the acceptance threshold value, the data measurement parameters and the offset calculation parameters from any of the first, second and third pieces of reliability information or their combination. The output of this threshold value parameter setting section 18 is input to the sensitivity/offset correction calculation section 16 and the reliability information calculation section 19. This reliability information calculation section 19 calculates not only the first and second pieces of reliability information from the predetermined number of the recent acquired data and/or from the predetermined number of the recent offset but also the third reliability information from a data measurement parameter and an offset measurement calculation parameter. The reliability information is output from the reliability information calculation section 19.

This reliability information is further output to the sensitivity/offset correction calculation section 16. This sensitivity/offset correction calculation section 16 compares the threshold value input from the threshold value parameter setting section 18 and the reliability information from the reliability information calculation section 19 thereby to evaluate whether the calculated offset is to be adopted, and outputs the adopted offset to the azimuth calculation section 20.

The magnetism components other than the geomagnetism (i.e., the steady magnetic field) are acquired (as referred to PCT Laid-Open WO2004/003476) by applying the magnetic data group of N ($\geq 4$) acquired by the azimuth measurement device to the spherical surface thereby to determine the center coordinates (e.g., the offset and the reference point) of the sphere. The radius of the sphere determined at the same time indicates the magnitude of the geomagnetism. Here, the magnetism data is the 2- or 3-axis measured values acquired by one measurement by the magnetic sensor, and the magnetism data group is a set of 2- or 3-axis measured values acquired by several measurements by the magnetic sensor.

Figure 3:
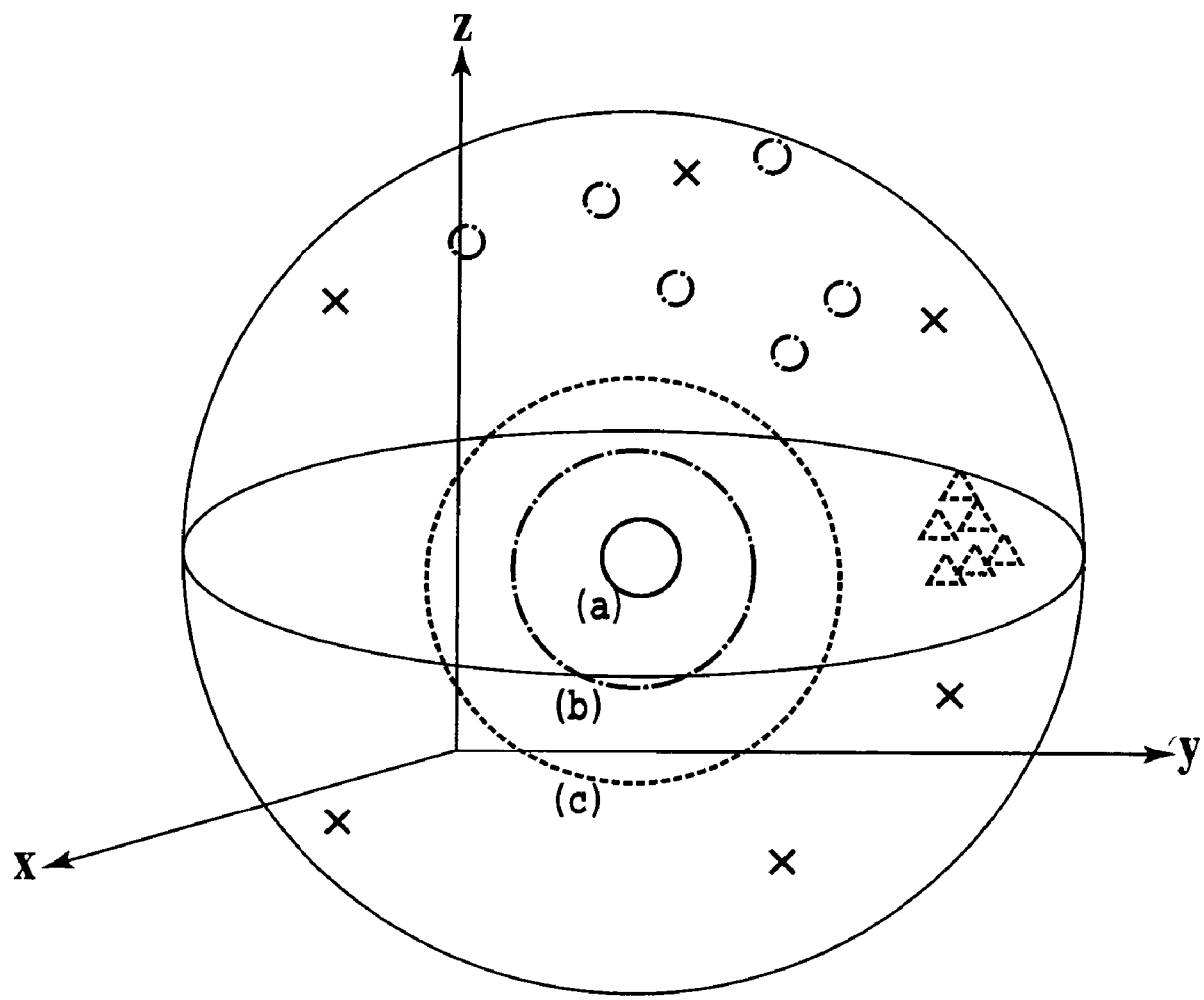
FIG. 3 is a diagram showing the dispersion of data composing a group of magnetically measured data and the dispersion of a reference point.

FIG. 3 is a diagram showing the dispersion of data composing a group of magnetically measured data and the dispersion of the reference point.

The reference point may be caused to contain a large error by the distribution of the data composing the measured magnetism data group. When the measured data group is absent or when the existing data group is ineffective, as just after the power up or as the peripheral magnetic state highly changes, a long time may be taken till the correct value is calculated, if the value for deciding the offset update is excessively small (or strict). It is, therefore, necessary to set the acceptance threshold high (or loose) at first. It is confirmed that the data composing the measured magnetism data group are properly distributed on the spherical surface, and that the fluctuation width of the reference point to be calculated becomes small. After this confirmation, the accuracy of the offset to be calculated can be enhanced, if the acceptance threshold is made gradually small (or strict). The dispersion may use an index capable of expressing the data distribution, such as the difference between the maximum and the minimum of each axis of the magnetic data group or the standard deviation of the measured values of each axis.

Figure 4:
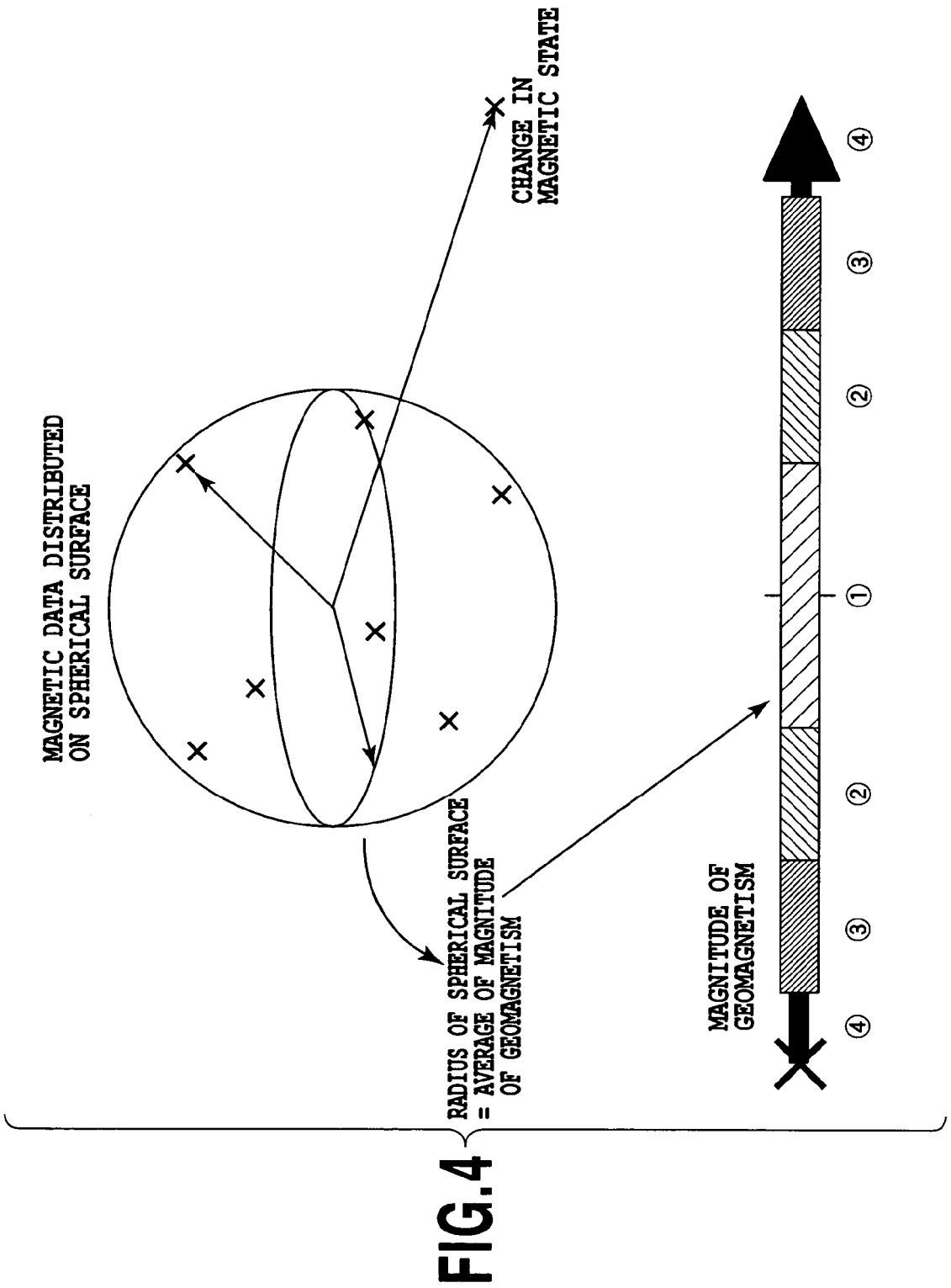
FIG. 4 is a diagram showing the change in a magnetic state, the magnitudes of a geomagnetism and the classification of the geomagnetism magnitudes.

FIG. 4 is a diagram showing the change in a magnetic state, the magnitudes of the geomagnetism and the classification of the geomagnetism magnitudes.

In case the peripheral magnetic state highly changes, the followings are happen. The magnitudes of the geomagnetism vectors calculated on the basis of the center coordinates used till then takes values largely different from the radius of the spherical surface. In this case, the magnetism data group acquired has to be discarded, and the center coordinates and the radius have to be recalculated with the data group newly acquired (alternatively, the center coordinates may also be smoothly updated by calculating the center coordinates with the magnetic data group acquired till then).

As the means for knowing the change in the magnetic state, the method of comparing the distance of the magnetic data calculated from the reference point and the radius of the sphere adopted, or the method of comparing the distance of the magnetic data calculated from the reference point and the magnitude (e.g., 45 to 50 micro-teslas ($\mu$T)) of the geomagnetism may be anticipated.

When the change in the magnetic state occurs, the offset largely changes, and the offset adopted cannot be frequently utilized. In this case, the acceptance threshold for determining the highly accurate offset immediately before the change in the magnetic state is loosened to an acceptance threshold for determining the offset more quickly. Then, the acceptance threshold can respond to the change in the offset quickly. It is also frequently effective to return the acceptance threshold to an initial value.

The means for knowing that the magnetic state has changed should not be limited to the calculation of the magnitudes of the geomagnetism (e.g., the comparison with the absolute value of the geomagnetism or the radius) but also the angle of depression (geomagnetic inclination) (FIG. 8), the range of an A/D value, the range of dispersion of the reference point, the difference from the reference point calculated immediately before, or the known event to cause the change in the magnetic state. However, the range of the dispersion of the reference point and the difference of the reference point are calculated by using the reference point which is estimated from the data group containing the magnetic data before and after the change in the magnetism state, so that the detection sensitivity becomes low. When a known event for causing the change in the magnetic state exists, means for detecting the event can be provided for knowing the change in the magnetic state with an event detection signal.

In case the azimuth measurement device is packaged in a foldable cell-phone, for example, the magnetic state changes when the cell-phone is folded. Moreover, some latest cell-phone can use an external memory card for storing image data or music data and may be changed in the magnetic state by inserting/extracting the memory card. The cell-phone may be equipped with a button for informing the azimuth measurement device of the change in the magnetic state in accordance with the decision of the user. In case the magnetic detector has temperature characteristics such as those of the Hall element, the offset may also be recalculated in case the temperature change detected is at a predetermined value or higher.

Figure 5:
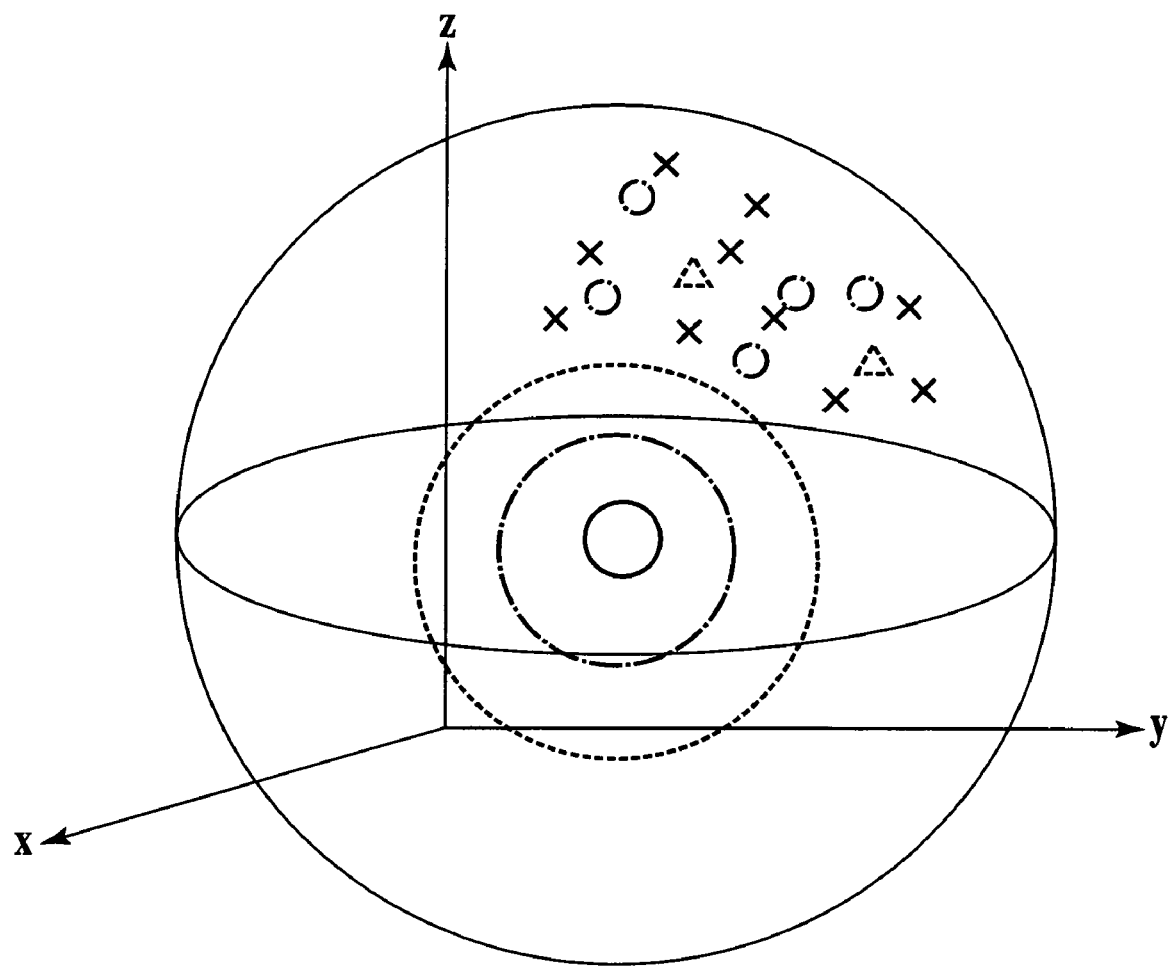
FIG. 5 is a diagram showing the number of offset calculation point and calculation accuracy.

FIG. 5 is a diagram showing the number of offset calculation point and a calculation accuracy.

When the number of data composing the magnetic data group for calculating the reference point is changed simultaneously as the acceptance threshold is changed, the response rate and the calculation accuracy can be better controlled. Just after the power-up, the number of data composing the magnetism data group is reduced to make the response better although the calculation accuracy is rough, so that the calculation accuracy is enhanced by tightening the acceptance threshold gradually and by enlarging the number of data composing the magnetic data group.

By thus updating the acceptance threshold and changing the parameters for the data measuring conditions or the offset calculating conditions, the azimuth measurement device can be controlled according to the change in the environment. The parameters are exemplified not only by the number of data composing the magnetism data group for calculating the reference point but also by the minimum change in the continuous magnetism data, the time interval of the magnetism data measurement, the number of reference points for calculating the dispersion of the reference points, the magnetism data judgment time (e.g., a predetermined number A and a predetermined number B), and the amplification of a magnetic sensor amplifier.

In case the position of the azimuth measurement device does not change so much in the two-dimensional or three-dimensional space, the measured magnetic data output from the magnetic sensor does not change so much. Even if the reference point is calculated from the data group composing the magnetism data of a small change, the fluctuation of the data or the influence of noises may become so large as to make the reference point inaccurate. It is, therefore, important for enhancing the accuracy of the offset to evaluate the change of the data output from the magnetic sensor from the data selected and adopted beforehand, thereby to adopt and compose only the data having changed a predetermined value or higher, into the data group. If the threshold value of the change is raised, however, the data is adopted when the azimuth measurement device highly moves so that a long time is taken before the offset is calculated. In short, the data of a small change is also adopted when the offset is to be quickly determined although its reliability is low. But only the data of a large change is adopted when the reliability is to be enhanced although the calculation of the offset takes a long time.

The measurement time interval of the magnetic data is set as long as possible because it is concerned with the power consumption of the azimuth measurement device. When the offset is to be quickly calculated, however, the measurement time interval can be shortened to acquire the necessary data for the short time period.

In order to evaluate the reliability of the offset, the dispersion of the reference points estimated is evaluated.

The number of reference points to be evaluated is desired to be as many as possible. However, the number of reference points to be evaluated has to be as small as possible, when the measured data group is absent or when the existing data group is ineffective as the power up state or as the peripheral magnetic state highly changes.

In case the magnetic state suddenly changes and quickly returns to the initial state (as is exemplified by erroneously bringing the magnet close to the azimuth measurement device), it is premature to discard the center coordinates quickly. The offset need not be discarded (at the predetermined number A), if the magnitude of the geomagnetism or the like returns to an allowable value within a predetermined time period.

In another method (at the predetermined number B), the acceptance threshold is made strict, awaiting the calculation of a predetermined number or more of the offset at an acceptance threshold. The value of the offset in the case of a loose acceptance threshold is low in reliability so that the adoption of the mistaken offset can be prevented by a method of averaging a plurality of offsets.

Figure 7:
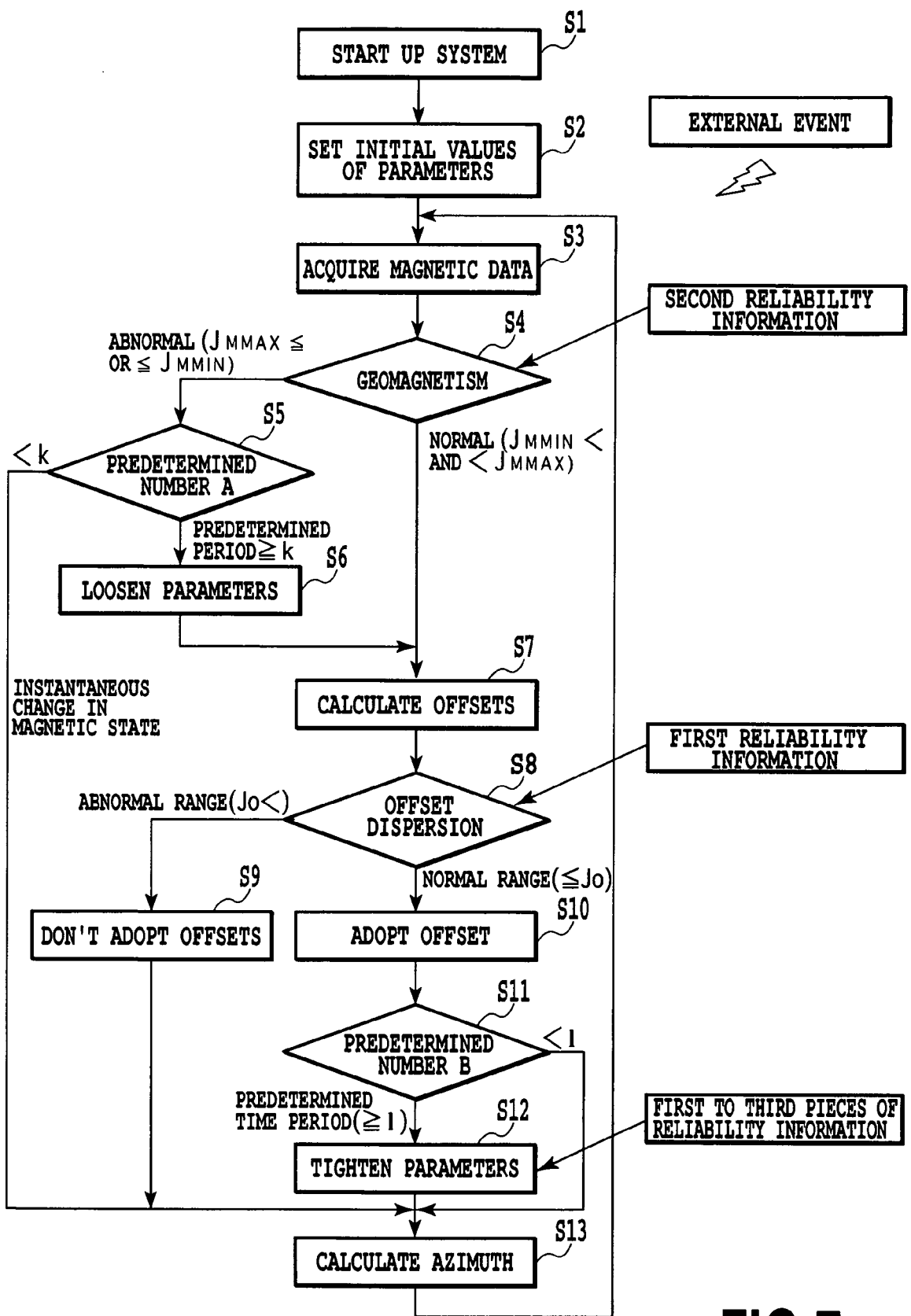
FIG. 7 is a diagram showing a flow chart for explaining an offset updating.

FIG. 7 is a diagram showing a flow chart for explaining the offset updating.

In FIG. 7: a parameter JM indicates a geomagnetism threshold value; a parameter JO an offset threshold value; and parameters k and l the numbers acceptance thresholds unchanged.

Hereinafter, the flow chart shown in FIG. 7 is described.

At first, the system is started up (at S1), and the initial values of parameters are set (at S2). Next, the magnetic data is acquired (at S3) to evaluate (at S4) (i.e., for the second reliability information) whether the geomagnetism is normal or abnormal. In the abnormal case, the predetermined number A(k) is decided (at S5). If the number A(k) is a predetermined time period or longer, the parameters are loosened (at S6). If shorter than the predetermined time period, the routine shifts to the azimuth calculation (at S13).

In case the geomagnetism is normal, the reference point calculation is made (at S7) to evaluate (at S8) (i.e., the first reliability information) whether or not the reference points are dispersed. The reference points are not adopted (at S9), if this dispersion is within the abnormal range, but adopted (at S10) as the offsets if within the normal range. Next, the predetermined number B(1) is evaluated (at S11). The parameters are tightened (at S12) (i.e., the first to third pieces of reliability information), and the azimuth calculation is made (at S13), if the time period is at a predetermined value or longer. The azimuth calculation is made (at S13) as it is, and the routine returns to the aforementioned step 3, if the time period is shorter.

The magnitude of the geomagnetism can be used as an indicator of reliability of the offset. When the offset is calculated, the radius of the sphere having the magnetic data distributed is calculated. In case, however, the radius of the sphere is outside of the range of the acceptance threshold set from the magnitude (e.g., 45 to 50 micro-teslas in Japan) of the ordinarily estimated geomagnetism, the offset can be unadopted because of the low reliability of the offset value.

The acceptance threshold and the parameters such as the data measurement conditions or the offset calculating conditions may be either prepared beforehand as a table, as shown in FIG. 6, or calculated from the magnitude of the geomagnetism or the dispersion value of the reference points by numerical equations. In case the table is prepared, moreover, the updating sequence may be determined either by updating the states one by one or by skipping the several states.

When the acceptance thresholds are narrowed, for example, it is proper to narrow the acceptance thresholds and the parameters step by step. In case the reliability is seemed to be low when the calculated magnitude of the geomagnetism is abnormally high, it is proper to loosen the acceptance thresholds and the parameters all at once to their initial values and to calculate the offsets again. As the case may be, it is arbitrary to narrow the acceptance thresholds and the parameters by the steps.

If the azimuth measurement device can output the acceptance thresholds (i.e., the first reliability and the second reliability) occasionally used and the measurement parameters (i.e., the data measurement conditions and the offset information calculation conditions) that is the third reliability information, the user or the using device of the azimuth measurement device can know the accuracy and the reliability of the azimuth to be output. In case the four states expressing the reliability exist, for example, as shown in the table of FIG. 6, the user is enabled to know the accuracy and the reliability of the azimuth indicated by the azimuth measurement device, easily by indicating those states in numerals or colors in the display section of the azimuth measurement device.

Alternatively, another system using the output of the azimuth measurement device can know the accuracy and reliability of the azimuth and can also operate a high-order application in accordance with the accuracy and the reliability of the azimuth.

Specifically, in case the reliability of the calculated azimuth is low in the application for turning the map display in accordance with the azimuth information, the probability of giving erroneous azimuth information to the user can be lowered to prevent the confusion of the user either by making counter-measures of neither updating the display of the azimuth nor turning the map.

Figure 8:
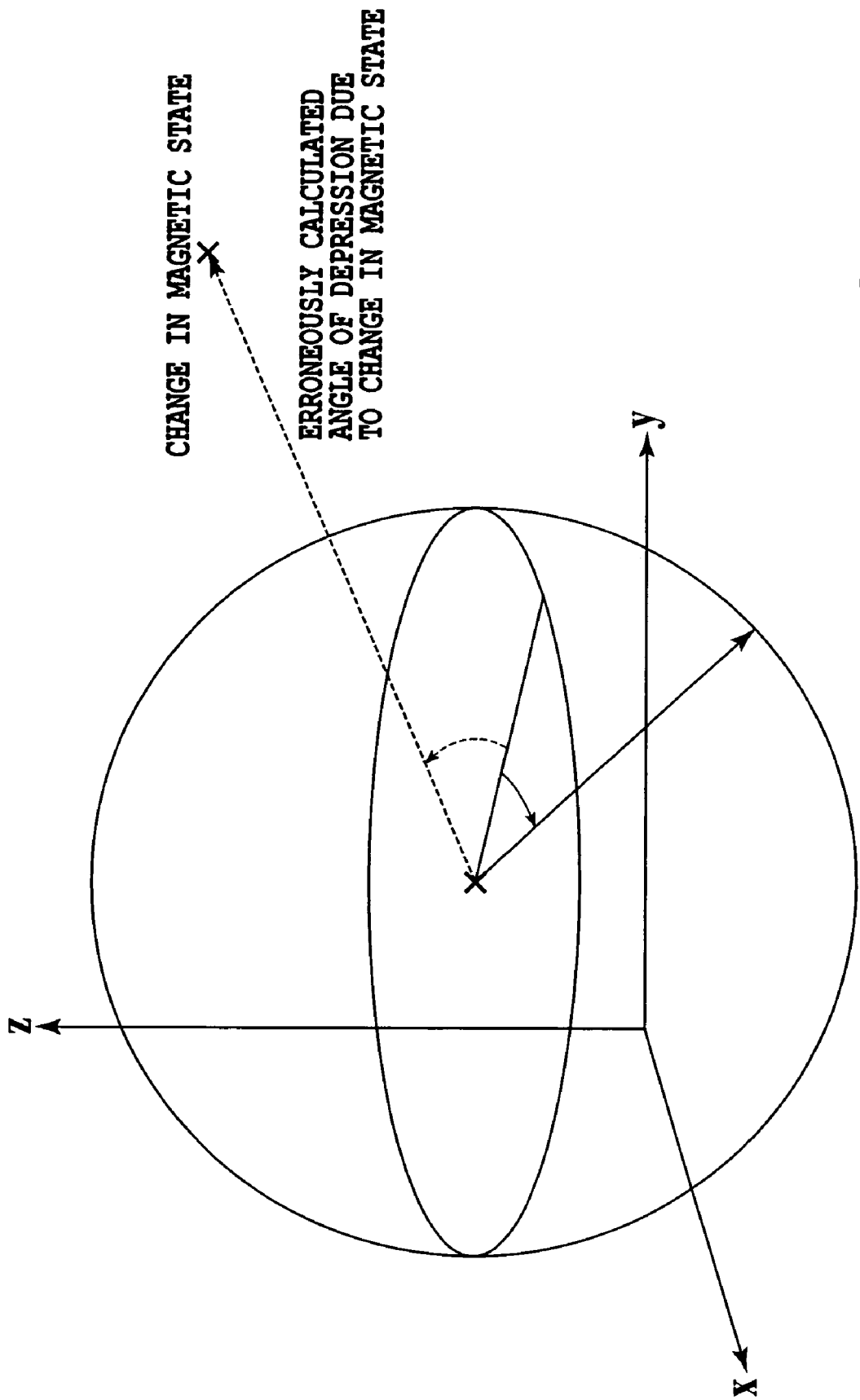
FIG. 8 is a diagram showing a measured output data distribution when the azimuth measurement device is placed in a horizontal position.

By monitoring not only the magnitude of the geomagnetism but also the angle of depression, for example, the change in the peripheral magnetic condition can be known, as shown in FIG. 8. With the function to monitor the geomagnetic inclination angle, moreover, whether or not the azimuth measurement device is in the specified position can be decided in dependence upon whether or not the geomagnetic inclination angle calculated from the obtained output data is within the normal range (e.g., about 45 degrees in Japan), when the azimuth measurement device requests the user for the predetermined (e.g., horizontal) position.

In the case of the azimuth measurement device not having the function to measure the tilting angle of the device when the azimuth is to be measured so that the measurement accuracy deteriorates unless it is held in the horizontal direction, whether or not the azimuth measurement device is horizontal is discriminated by the aforementioned means thereby to evaluate the reliability of the data. In an alternative method, the user can be instructed to place the azimuth measurement device horizontally.

Here, the first reliability information is the range of the dispersion of the reference points, the dispersion (i.e., the dispersion in the two-dimensional or three-dimensional space) of data composing the measured data group, and the distances from the output data to the reference points. Moreover, the predetermined number A is exemplified by the number or time length which is decided with a tendency to measure the dispersion of the reference points and the dispersion of the data composing the measured data group either a plurality of times or for a predetermined time period. On the other hand, the second reliability information is exemplified by the magnitude, geomagnetic inclination angle or A/D value of the geomagnetism vector calculated from the adopted reference points and the latest measured data. Moreover, the predetermined number B is exemplified by the number or time length which is decided with a tendency to measure the magnitude of the geomagnetism vector, the geomagnetic inclination angle, the A/D value, and the dispersion of the recent reference point. Moreover, the data measurement conditions and the offset information conditions (i.e., the parameters) are exemplified by the number of data composing the magnetic data group for calculating the reference points, the minimum change in the sequential output data, the output data measurement time interval, the number of reference points for calculating the dispersion of reference points, and the aforementioned predetermined numbers A and B.

Figure 9:
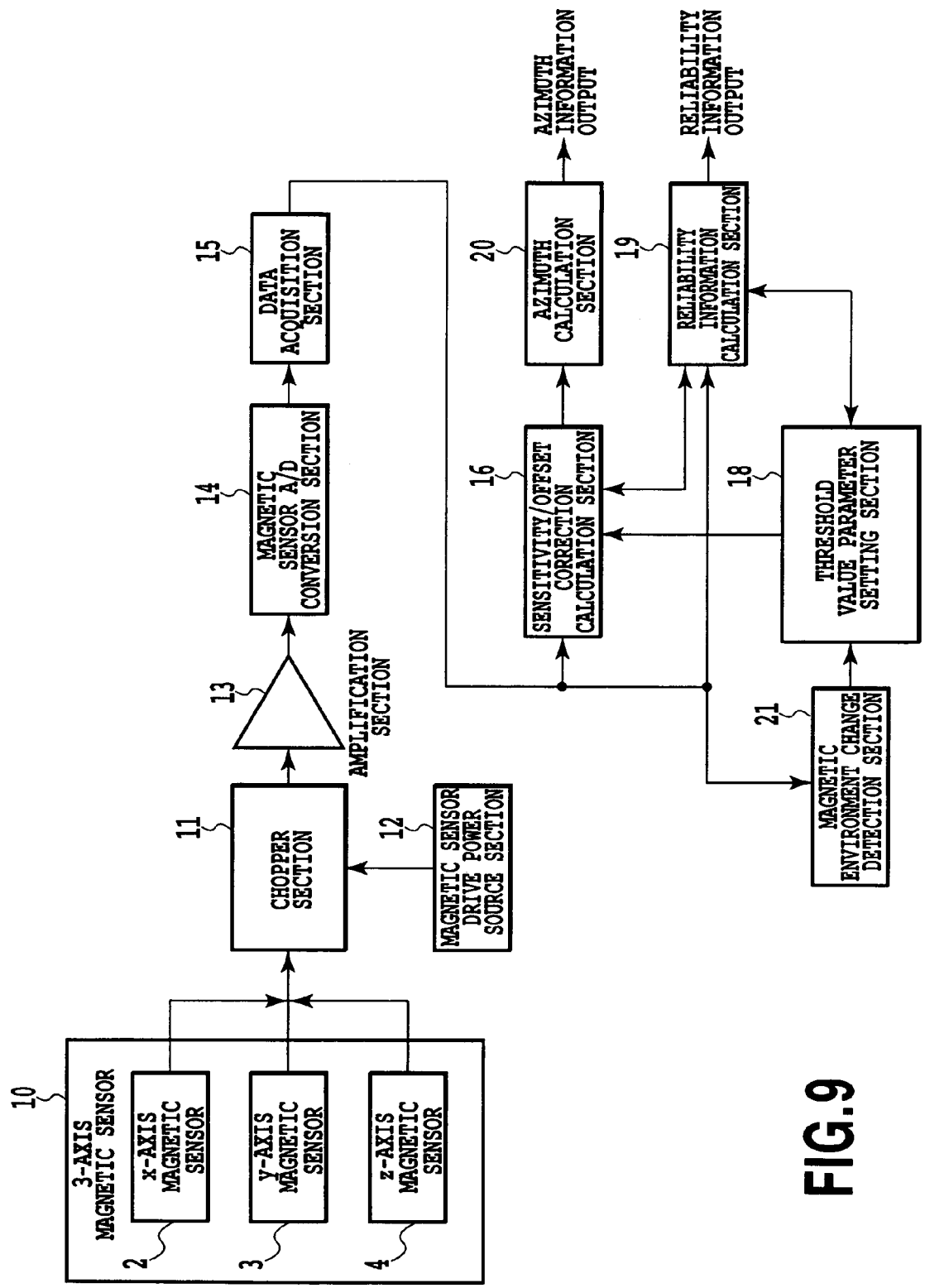
FIG. 9 is a block diagram for explaining another embodiment of the azimuth measurement device having the 3-axis magnetic sensor according to the invention.

FIG. 9 is a block diagram for explaining another embodiment of the azimuth measurement device having the 3-axis magnetic sensor according to the invention. In FIG. 9, numeral 21 designates a magnetic environment change detection section, and the remaining components having the same functions as those of FIG. 2 are designated by the same numerals.

The magnetic environment change detection section 21 is not only connected with the data acquisition section 15 but also connected individually with the sensitivity/offset correction calculation section 16, the threshold value parameter setting section 18 and the reliability information calculation section 19. The magnetic environment change detection section 21 detects it, in case the data acquired by the data acquisition section 15 exceeds a predetermined range, that the magnetic state has changed. The threshold value parameter setting section 18 is configured to loosen its acceptance threshold value when the magnetic environment change detection section 21 detects the change of the magnetic environment.

With this configuration, the magnetic environment change detection section can detect it, in case the data acquired by the data acquisition section exceeds the predetermined range that the magnetic state has changed.

INDUSTRIAL APPLICABILITY

The present invention relates to an azimuth measurement device and an azimuth measurement method and, more particularly, to an azimuth measurement device and an azimuth measurement method for calculating an offset quickly or highly accurately from the magnetic data group acquired for measuring an azimuth, in accordance with the situations.

The invention claimed is:

1. An azimuth measurement device comprising:
   2- or 3-axis geomagnetism detection means for detecting the geomagnetism;
   output data acquisition means for acquiring repeatedly a predetermined number of times or more, either the 2-axis output data at the time when the direction of the geomagnetism detection means changes while keeping the 2-axis detecting directions on a predetermined plane, or the 3-axis output data at the time when the direction of the geomagnetism detection means changes in the three-dimensional space;
   offset information calculation means for determining a reference point either on 2-axis coordinate space composed of the 2-axis output data or on 3-axis coordinate space composed of the 3-axis output data thereby to estimate the coordinates of the reference point so that the dispersion of the distances from the 2- or 3-axis output data group obtained by the output data acquisition means, to the reference point may be minimized, and for calculating the offset information of the output data of the geomagnetism detection means on the basis of the coordinates of the reference point; and reliability information calculation means for obtaining first reliability information relating to the reliability of the offset information calculated by said offset information calculation means, wherein an acceptance threshold value at the time of calculating said offset information is gradually tightened on the basis of the first predetermined number of the recent first reliability information calculated by said reliability information calculation means.

2. An azimuth measurement device according to claim 1, further comprising reliability information calculation means for obtaining second reliability information relating to the reliability of the offset information from the output data acquired latest, wherein an acceptance threshold value at the time of calculating said offset information is loosened, in case the reliability deteriorates, on the basis of second reliability information of the recent second predetermined number calculated by said reliability information calculation means.

3. An azimuth measurement device according to claim 2, wherein said second reliability information is the distance from the 2- or 3-axis output data obtained by said output data acquisition means, to the reference point.

4. An azimuth measurement device according to claim 2, wherein said second reliability information is calculated from a geomagnetic inclination angle information calculated from the 3-axis output data obtained by said output data acquisition means.

5. An azimuth measurement device according to claim 2, further comprising first and second external output means for outputting said first and second pieces of reliability information to the outside.

6. An azimuth measurement device according to claim 2, wherein not only the acceptance threshold value at the time of calculating said offset information but also the data measurement conditions and/or the offset information calculation conditions are changed.

7. An azimuth measurement device according to claim 6, wherein said second reliability information is the distance from the 2- or 3-axis output data obtained by said output data acquisition means, to the reference point.

8. An azimuth measurement device according to claim 6, wherein said second reliability information is calculated from a geomagnetic inclination angle information calculated from the 3-axis output data obtained by said output data acquisition means.

9. An azimuth measurement device according to claim 6, wherein said data measurement condition value and/or said offset information calculation condition contains a measurement time interval.

10. An azimuth measurement device according to claim 6, wherein said data measurement condition value and/or said offset information calculation condition contains number of data for calculating the offset information.

11. An azimuth measurement device according to claim 6, wherein said data measurement condition value and/or said offset information calculation condition contains said first and/or second predetermined number.

12. An azimuth measurement device according to claim 6, further comprising: reliability information calculation means for obtaining third reliability information from said data measurement condition value and/or said offset information calculation condition; and third external output means for outputting said third reliability information from said reliability information calculation means.

13. An azimuth measurement device according to claim 1, wherein said first reliability information is calculated from the dispersion of the recent reference point.

14. An azimuth measurement device according to claim 1, wherein said first reliability information is calculated from the dispersion of the data of said closes 2- or 3-axis output data group.

15. An azimuth measurement device according to claim 1, further comprising detection means for detecting a specific event, wherein the acceptance threshold value at the time of calculating the offset information in case said event occurs are changed.

16. An azimuth measurement device according to claim 15, wherein said specific event is a specific operation by an operator.

17. An azimuth measurement device comprising:

3-axis geomagnetism detection means for detecting the geomagnetism;

output data acquisition means for acquiring the 3-axis output data at the time when the direction of said geomagnetism detection means changes in the three-dimensional space, repeatedly a predetermined number of times or more;

offset information calculation means for determining a reference point on three-dimensional coordinates composed of said 3-axis output data, to estimate the coordinates of the reference point from the 3-axis output data group obtained by said output data acquisition means, and for calculating the offset information for the output data of said geomagnetism detection means on the basis of the coordinates of said reference point; and reliability information calculation means for obtaining second reliability information relating to the reliability of the offset information from the output data obtained latest by said output data acquisition means, wherein the second reliability information calculated by said reliability information calculation means is calculated from both the geomagnetic inclination angle information expected with the premise that the azimuth measurement device is horizontally held and the geomagnetic inclination angle information calculated from the output data acquired latest by said output data acquisition means.

18. An azimuth measurement device comprising:

2- or 3-axis geomagnetism detection means for detecting the geomagnetism;

output data acquisition means for acquiring several times or more, either the 2-axis output data at the time when the direction of said geomagnetism detection means changes while keeping said 2-axis detecting directions on a predetermined plane or the 3-axis output data at the time when the direction of said geomagnetism detection means changes in the three-dimensional space;

offset information calculation means for estimating the coordinates of the reference point so that the dispersion of the distances from selected 2- or 3-axis output data group to the reference point may be minimized; said reference point estimation means also selecting said 2- or 3-axis output data on the basis of predetermined measurement parameters, and also determining a reference point either on the two-dimensional coordinate composed of said selected 2-axis output data or on the three-dimensional coordinates composed of said selected 3-axis output data, and for calculating the offset information for the output data of said geomagnetism detection means on the basis of a plurality of estimated reference points;

azimuth calculation means for calculating an azimuth from said output data and said offset information; and reliability information calculation means for calculating the second reliability information of said offset information according to calculation parameters for calculating the reliability information of predetermined offset information, on the basis of at least one of said 2- or 3-axis output data group and said plural reference points.

19. An azimuth measurement device according to claim 18,
wherein said offset information calculation means compares said reliability information with an acceptance threshold value to evaluate whether or not said reliability information is to be adopted as the offset information to be used for the calculation of the azimuth by said azimuth calculation means.

20. An azimuth measurement device according to claim 19,
wherein said acceptance threshold value is changed more strictly as said offset information is adopted a predetermined number of times.

21. An azimuth measurement device according to claim 19, further comprising a detection section for detecting the magnetic environment inside and outside of the azimuth measurement device and the change in said magnetic environment,
wherein said acceptance threshold value is loosened in case said detection section detects that said magnetic environment has changed.

22. An azimuth measurement device according to claim 21,
wherein said detection section detects that the magnetic environment has changed, in case the data acquired by said output data acquisition means exceeds a predetermined range.

23. An azimuth measurement device according to claim 19, further comprising:
event detection means for detecting either the change in the environment of the azimuth measurement device or the operation of the operator,
wherein said acceptance threshold value is changed in case said event occurs.

24. An azimuth measurement device according to claim 23,
wherein said environment change is a temperature change.

25. An azimuth measurement device according to claim 19,
wherein at least one of said measurement parameters and said calculation parameters are changed, when said acceptance threshold value is changed.

26. An azimuth measurement device according to claim 19,
wherein the reliability information of said offset information contains the information calculated from the dispersion of the plural reference points.

27. An azimuth measurement device according to claim 19,
wherein the reliability information of said offset information contains the information calculated from the dispersion of the data composing said 2- or 3-axis output data group.

28. An azimuth measurement device according to claim 19,
wherein the reliability information of said offset information contains the distance from the 2- or 3-axis output data obtained by said output data acquisition means, to the reference point.

29. An azimuth measurement device according to claim 19,
wherein said measurement parameters contain a measurement interval.

30. An azimuth measurement device according to claim 19,
wherein said measurement parameters contain the variation in data,
wherein said variation is the difference between the output data acquired by said output data acquisition means and the data selected by said offset information calculation means for estimating said reference point, and
wherein said offset information calculation means selects the data, of which said variation is at a predetermined value or higher.

31. An azimuth measurement device according to claim 19,
wherein said measurement parameters contain the number of data for said offset information calculation means to estimate the coordinates of the reference point.

32. An azimuth measurement device according to claim 19,
wherein said calculation parameters contain the number of reference points for calculating the dispersion of said reference points.

33. An azimuth measurement device according to claim 19, further comprising output means for outputting at least one of said acceptance threshold value, said measurement parameters and said calculation parameters to the outside.

34. An azimuth measurement device according to claim 19,
wherein said geomagnetism detection means acquires 3-axis output data and calculates geomagnetic inclination angle information from said output data, and
wherein second reliability information is calculated from the value of said geomagnetic inclination angle information.

35. An azimuth measurement method comprising:
the step of acquiring, by using 2- or 3-axis geomagnetism detection means for detecting the geomagnetism, either the 2-axis output data at the time when the direction of said geomagnetism detection means changes or the 3-axis output data at the time when the direction of said geomagnetism detection means changes in the three-dimensional space, a plurality of times or more while keeping said 2-axis detecting directions on a predetermined plane;
the step of selecting said 2- or 3-axis output data on the basis of predetermined measurement parameters;
the step of determining a reference point either on the two-dimensional coordinate composed of said selected 2-axis output data or on the three-dimensional coordinates composed of said selected 3-axis output data, thereby to estimate the coordinates of the reference point so that the dispersion of the distances from said selected 2- or 3-axis output data group to the reference point may be minimized;

the step of calculating the offset information for the output data of said geomagnetism detection means on the basis of said plural reference points estimated;

the step of calculating an azimuth from said output data and said offset information; and the step of calculating the second reliability information of said offset information according to, calculation parameters for calculating the reliability information of predetermined offset information, on the basis of at least one of said 2- or 3-axis output data group and said plural reference points.

36. An azimuth measurement method according to claim 35, wherein said offset information calculation step compares said reliability information with an acceptance threshold value to evaluate whether or not said reliability information is to be adopted as the offset information to be used for the calculation of the azimuth.

37. An azimuth measurement method according to claim 36, wherein said acceptance threshold value is changed more strictly as said offset information is adopted a predetermined number of times.

38. An azimuth measurement method according to claim 36, further comprising:

the step of detecting that the magnetic environment inside and outside of the azimuth measurement device has changed after the step of acquiring said output data plural times; and the step of loosening said acceptance threshold value in case it is detected that said magnetic environment has changed.

39. An azimuth measurement method according to claim 38, wherein said detection step detects that the magnetic environment has changed, in case the data acquired exceeds a predetermined range.

40. An azimuth measurement method according to claim 36, further comprising:

the step of detecting either the change in the environment of the azimuth measurement device or the operation of the operator; and the step of changing said acceptance threshold value in case said event occurs.

41. An azimuth measurement method according to claim 40, wherein said environment change is a temperature change.

42. An azimuth measurement method according to claim 36, wherein said acceptance threshold value is changed, and
wherein at least one of said measurement parameters and said calculation parameters are changed.

43. An azimuth measurement method according to claim 36, wherein the reliability information of said offset information contains the information calculated from the dispersion of the plural reference points.

44. An azimuth measurement method according to claim 36, wherein the reliability information of said offset information contains the information calculated from the dispersion of the data composing said 2- or 3-axis output data group.

45. An azimuth measurement method according to claim 36, wherein the reliability information of said offset information contains the distance from the 2- or 3-axis output data obtained by said output data acquisition means, to the reference point.

46. An azimuth measurement method according to claim 36, wherein said measurement parameters contain a measurement interval.

47. An azimuth measurement method according to claim 36, wherein said measurement parameters contain the change in data,
wherein said change is the difference between the output data acquired by said output data acquisition means and the data selected by said reference point estimation means, and
wherein said reference point estimation means selects the data, of which said change is at a predetermined value or higher.

48. An azimuth measurement method according to claim 36, wherein said measurement parameters contain the number of data for estimating the coordinates of the reference point.

49. An azimuth measurement method according to claim 36, wherein said calculation parameters contain the number of reference points for calculating the dispersion of said reference points.

50. An azimuth measurement method according to claim 36, further comprising the step of outputting at least one of said acceptance threshold value, said measurement parameters and said calculation parameters to the outside.

51. An azimuth measurement method according to claim 36, wherein said geomagnetism detection step acquires 3-axis output data, further comprising:
the step of calculating geomagnetic inclination angle information from said output data after the step of acquiring said output data plural times; and
the step of calculating second reliability information from the value of said geomagnetic inclination angle information.

52. An azimuth measurement device comprising:

a geomagnetism detector for detecting a geomagnetism;
an output data element for acquiring repeatedly a predetermined number of times or more output data from the geomagnetism detector at a time when the direction of the geomagnetism detector changes;
a reference point estimator for, determining a reference point either on a coordinate space composed of the output data thereby to estimate the coordinates of the reference point by a statistical method so that the dispersion of the distances from the output data group obtained by the output data element, to the reference point may be minimized;
an offset information calculator for calculating offset information of the output data of the geomagnetism detector on the basis of the coordinates of the reference point calculated by the reference point estimator; and
a first reliability information calculator for calculating reliability information relating to the reliability of the offset information calculated by said offset information calculator, wherein an acceptance threshold value at the time of calculating said offset information is gradually tightened on the basis of the first predetermined number of the recent first reliability information calculated by said first reliability information calculator.

53. An azimuth measurement device according to claim 52, further comprising second reliability information calculator for relating to the reliability of the offset information from the output data acquired latest, wherein an acceptance threshold value at the time of calculating said offset information is loosened, in case the reliability deteriorates, on the basis of second reliability information of the recent second predetermined number calculated by said second reliability information calculator.

54. An azimuth measurement device according to claim 53, wherein said second reliability; information is the distance from the output data obtained by said output data element, to the reference point.

55. An azimuth measurement device according to claim 53, wherein said second reliability information is calculated from a geomagnetic inclination angle information calculated from the output data obtained by said output data element.

* * * * *

UNITED STATES PATENT AND TRADEMARK OFFICE
CERTIFICATE OF CORRECTION

PATENT NO. : 7,340,362 B2
APPLICATION NO. : 10/563128
DATED : March 4, 2008
INVENTOR(S) : Toru Kitamura et al.

It is certified that error appears in the above-identified patent and that said Letters Patent is hereby corrected as shown below:

On the title page, item (73), line 1, "Emd" should read --EMD--.

On the title page, item (57), line 12, "ND" should read --A/D--.

*In claim 14, column 14, line 9, "closes" should read --closest--.

In claim 35, column 17, line 10, "to, calculation" should read --to calculation--.

In claim 52, column 18, line 53, "for, determining" should read --for determining--.

In claim 54, column 20, line 3, "reliability; information" should read --reliability information--.

Signed and Sealed this

Twelfth Day of August, 2008

JON W. DUDAS
*Director of the United States Patent and Trademark Office*